US012750462B1

(12) United States Patent
Jung et al.

(10) Patent No.: US 12,750,462 B1
(45) Date of Patent: Sep. 29, 2026

(54) SYSTEMS AND METHODS FOR ADJUSTMENT OF 3D OBJECTS

(71) Applicant: Meta Platforms, Inc., Menlo Park, CA (US)

(72) Inventors: Kyunghun Jung, Sunnyvale, CA (US); Kyungho Kim, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 766 days.

(21) Appl. No.: 18/090,763

(22) Filed: Dec. 29, 2022

(51) Int. Cl.
*H04N 7/14* (2006.01)

(52) U.S. Cl.
CPC .................................. *H04N 7/147* (2013.01)

(58) Field of Classification Search
CPC .... H04N 19/463; H04N 19/119; H04N 19/20; H04N 21/2343
See application file for complete search history.

(56) References Cited

U.S. PATENT DOCUMENTS

2015/0264310 A1* 9/2015 Krishnaswamy ... H04L 12/1827 348/14.12
2020/0221159 A1* 7/2020 Stockhammer .. H04N 21/23439
2021/0005016 A1* 1/2021 Oh .......................... G06T 9/001

* cited by examiner

*Primary Examiner* — Amal S Zenati
(74) *Attorney, Agent, or Firm* — EVERSHEDS SUTHERLAND (US) LLP

(57) ABSTRACT

Systems, methods, and non-transitory computer-readable media can be configured to perform operations comprising determining three dimensional (3D) video associated with devices in a 3D video call, determining feedback control information from a first device of the devices, and providing adjustment information for a second device of the devices based on the feedback control information.

19 Claims, 9 Drawing Sheets

SYSTEMS AND METHODS FOR ADJUSTMENT OF 3D OBJECTS

FIELD OF THE INVENTION

The present technology relates to digital media. More particularly, the present technology relates to streaming three dimensional (3D) video.

BACKGROUND

Today, people often utilize computing devices (or systems) for a wide variety of purposes. For example, users can utilize computing devices to access a social networking system or other type of content or communication platform. The users can utilize the computing devices to interact with one another, share content items, and view content items via the platform. In some instances, a user may post content to a communication platform. Content posted to the communication platform may include text content items and media content items, such as audio, images, and videos. The posted content may be published to the communication platform and accessed by other users.

SUMMARY

Various embodiments of the present technology can include systems, methods, and non-transitory computer readable media configured to perform operations comprising determining three dimensional (3D) video associated with devices in a 3D video call, determining feedback control information from a first device of the devices, and providing adjustment information for a second device of the devices based on the feedback control information.

In an embodiment, the feedback control information is based on display of a first 3D video by the first device.

In an embodiment, at least one of: a bit rate, a frame size, or a number of points in a point cloud associated with a second 3D video of the second device is increased or decreased based on the adjustment information.

In an embodiment, the feedback control information includes field of view information associated with the first device, and wherein the adjustment information is based on the field of view information.

In an embodiment, the feedback control information includes device capabilities associated with the first device, and wherein the adjustment information is based on the device capabilities.

In an embodiment, the operations further comprise determining at least one of: network conditions, available bandwidth, link quality, or channel condition associated with the second device, wherein the adjustment information is based on the at least one of: network conditions, available bandwidth, link quality, or channel conditions.

In an embodiment, the feedback control information includes a bit rate of first 3D video captured by the first device, and wherein the adjustment information is based on the bit rate of the first 3D video.

In an embodiment, the feedback control information includes a pose associated with the first device, and wherein the adjustment information is based on a field of view determined based on the pose.

In an embodiment, the feedback control information is determined based on a change in objects in a field of view associated with the first device.

In an embodiment, the operations further comprise ordering objects in the 3D video associated with the devices in the 3D video call, and scaling the object in the 3D video associated with the devices in the 3D video call.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

Figure 1:
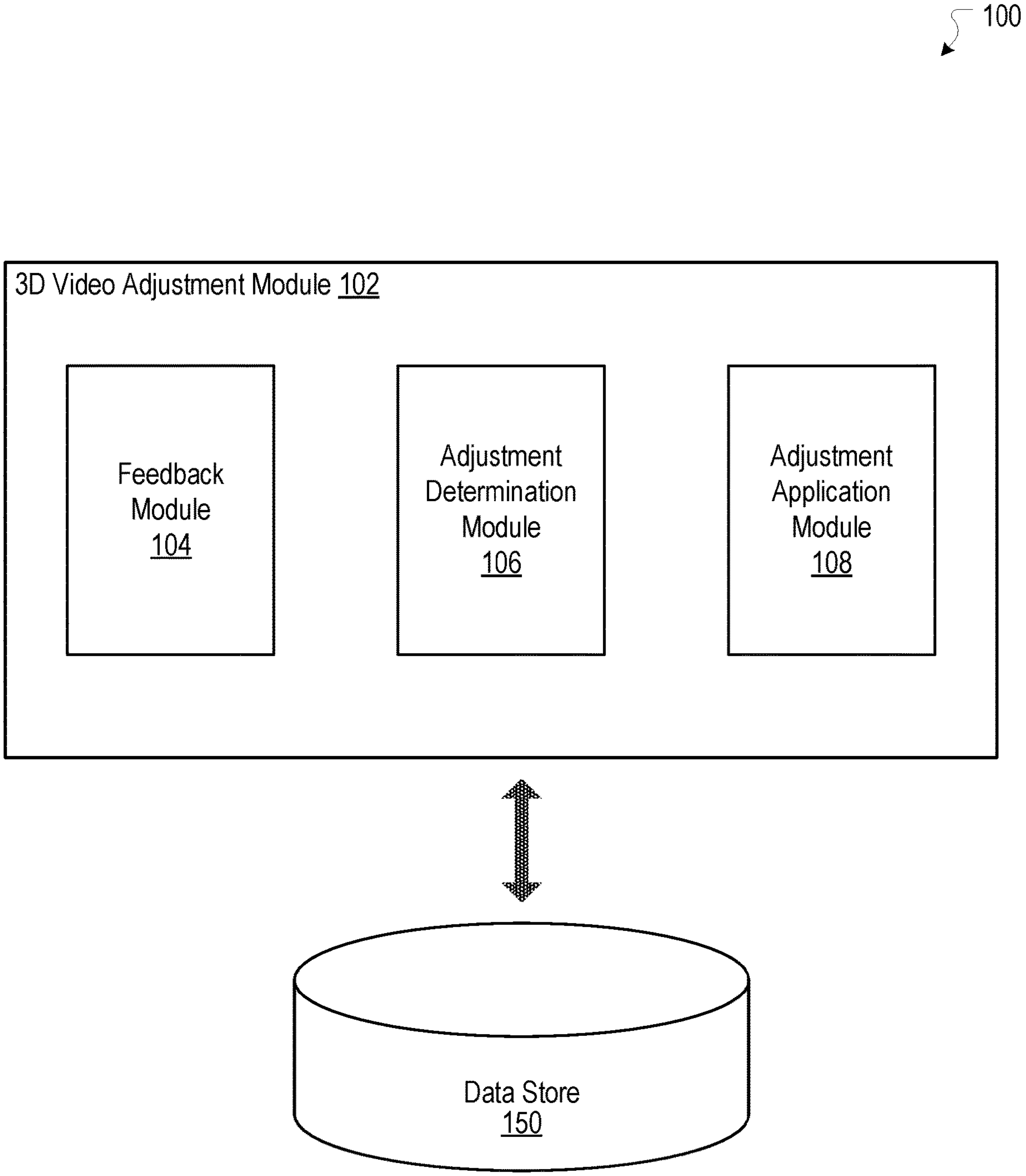
FIG. 1 illustrates an example system including a 3D video adjustment module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, people often utilize computing devices (or systems) for a wide variety of purposes. For example, users can utilize computing devices to access a social networking system or other type of content or communication platform. The users can utilize the computing devices to interact with one another, share content items, and view content items via the platform. In some instances, a user may post content to a communication platform. Content posted to the communication platform may include text content items and media content items, such as audio, images, and videos. The posted content may be published to the communication platform and accessed by other users.

In addition to posting content to a communication platform, users can interact with each other on the communication platform through real time communication. One way for users to interact with each other through the communication platform in real time is through video calling (e.g., video conferencing, video messaging). For example, a first user can initiate a video call with a second user through a communication platform. Video from the first user is sent to the second user in real time through the communication platform. Video from the second user is sent to the first user in real time through the communication platform. During the video call, the first user and the second user can see video of each other in real time and respond in real time. As illustrated in this example, real time communication provided through the communication platform can allow users to contemporaneously interact with each other. However, real time communication can require significant use of network resources and, accordingly, result in technological challenges associated with real time delivery of video. For example, a first device involved in a video call with a second device can send data beyond what the second device displays or beyond what the second device is capable of displaying. The first device sending data beyond what is used by the second device can result in excess use of network resources. These technological challenges are especially significant in real time communication that require relatively more network resources than video calling, such as three dimensional (3D) video calling (e.g., 3D video conferencing, 3D video messaging). Furthermore, these technological challenges are exacerbated as devices grow increasingly disparate with respect to capabilities. Thus, conventional approaches to real time communication face various technological challenges.

An improved approach rooted in computer technology overcomes the foregoing and other disadvantages associated with conventional approaches specifically arising in the realm of computer technology. In various embodiments, the present technology provides for adjustment with respect to 3D video and 3D objects captured by devices in a 3D video call. A device in the video call can capture 2D video and depth data. For each frame of 2D video and depth data, a 3D representation (e.g., point cloud) can be generated based on the 2D video frame and the depth data. A 3D video can be generated based on the 3D representations. The 3D video can be compressed (e.g., based on video-based point cloud compression (V-PPC)) and transmitted to a server. The server can decompress 3D videos from the devices in the video call. 3D objects (e.g., users of the devices) can be ordered and scaled. Based on the ordered and scaled 3D objects, the server can generate a 3D video to be compressed and transmitted to the devices in the 3D video call. The devices can decompress and display the 3D video from the server. Feedback control information, such as the 3D objects that were displayed (e.g., in a field of view), can be provided to the server. The server can generate adjustment information based on the feedback control information. The adjustment information can also be generated based on other information, such as network conditions and device capabilities. The adjustment information can be provided to the devices. The devices can adjust (e.g., resize) the 3D videos sent to the server. Thus, the present technology provides for efficient use of network resources based on adjustment with respect to 3D video and 3D objects.

As just one example, a first user can participate in a 3D video call with other users. The first user can use a first device to transmit 3D video of the first user to the other users. The 3D video of the first user can be compressed and transmitted to a server facilitating the 3D video call. The server can receive and decompress the 3D video of the first user. The server can also receive and decompress 3D videos of the other users. The server can order and scale the first user and the other users based on the 3D video of the first user and the 3D videos of the other users. For example, the head of the first user and the heads of the other users can be arranged in a circle for the 3D video call. A 3D video of the head of the first user and the heads of the other users can be generated by the server. The 3D video generated by the server can be compressed and transmitted to the devices of the first user and the other users. In this example, feedback control information from the other devices can be provided to the server. The feedback control information can include, for example, fields of view of the other users in the 3D video call. Based on the fields of view of the other users in the 3D video call, the server can determine a number of users for which the 3D video of the first user is displayed. The server can also determine network conditions associated with the first device. Based on the number of users for which the 3D video of the first user is displayed and the network conditions associated with the first device, adjustment information can be provided to the first device. The adjustment information can include, for example, a bit rate adjustment (e.g., temporary maximum media bit rate request). Based on the adjustment information, the first device can adjust the size of the 3D video that the first device compresses and transmits to the server. For example, the first device can increase or decrease a frame size of the 3D video compressed and transmitted to the server. As the first user and the other users continue the 3D video call, the fields of view of the first user and the other users can change. Network conditions associated with the first user and the other users can also change. Adjustment information can be provided to the first user and the other users during the 3D video call as appropriate to maintain efficient use of network resources. More details relating to the present technology are provided below.

FIG. 1 illustrates an example system 100 including a 3D video adjustment module 102, according to an embodiment of the present technology. As shown in the example of FIG. 1, the 3D video adjustment module 102 can include a feedback module 104, an adjustment determination module 106, and an object adjustment module 108. In some instances, the example system 100 can include at least one data store 150 in communication with the 3D video adjustment module 102. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the feedback module 104, the adjustment determination module 106, and the object adjustment module 108 can be implemented in any suitable combinations. While the 3D video adjustment module 102 is sometimes herein discussed in connection with a social networking system for purposes of illustration, the 3D video adjustment module 102 of the present technology can be used in or for any other type of content or communication platform that can support content delivery, such as a content delivery platform, a communication platform, etc. For example, the 3D video adjustment module 102 can be implemented in a suitable server system, such as a content delivery server.

In various embodiments, the 3D video adjustment module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some instances, the 3D video adjustment module 102 can be, in part or in whole, implemented as software running on one or more computing devices or systems, such as on a server system or a client computing device. In some instances, the 3D video adjustment module 102 can be, in part or in whole, implemented within or configured to operate in conjunction with or be integrated with a social networking system (or service), such as a social networking system 630 of FIG. 6. Likewise, in some instances, the 3D video adjustment module 102 can be, in part or in whole, implemented within or configured to operate in conjunction with or be integrated with a client computing device, such as a user device 610 of FIG. 6. For example, the 3D video adjustment module 102 can be implemented as or within a dedicated application (e.g., app), a program, or an applet running on a user computing device or client computing system. The application incorporating or implementing instructions for performing functionality of the 3D video adjustment module 102 can be created by a developer. The application can be provided to or maintained in a repository. In some instances, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The 3D video adjustment module 102 can be configured to communicate and/or operate with the data store 150, as shown in the example system 100. The data store 150 can be configured to store and maintain various types of data. In some implementations, the data store 150 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 150 can store information that is utilized by the 3D video adjustment module 102. For example, the data store 150 can store information associated with user preferences, content item templates, placeholder characters, personalized characters, and personalized content items. It is contemplated that there can be many variations or other possibilities.

In various embodiments, the feedback module 104 can determine feedback control information, which can include information associated with how three dimensional (3D) video is captured on a device, how the 3D video is transmitted, and how 3D video is displayed on the device. In general, a device can capture 3D video as a combination of two dimensional (2D) video (e.g., RGB video) and depth data. The 2D video and depth data can be converted to a point cloud and compressed (e.g., based on V-PPC) to generate the 3D video. Information associated with capture of a 3D video can include, for example, estimated frame size and size of object. A 3D video can be associated with a frame size. The frame size can indicate a size of a frame of the 3D video with respect to length, width, and depth. The frame size can be based on, for example, a distance between an object captured by a device and the device. The frame size also can be based on a size of the object with respect to length, width, and depth.

In general, 3D video can be transmitted based on a variety of protocols, such as Real-time Transport Protocol (RTP), User Datagram Protocol (UDP), and Internet Protocol (IP). Transmission of 3D video can involve, for example, a 5G radio protocol, such as Packet Data Converge Protocol (PDCP), Radio Link Control (RLC) protocol, and Medium Access Control (MAC) protocol. Transmission of 3D video over 5G can involve 5G entities, such as User Plane Function (UPF) and Definition Networks (DN). Information associated with transmission of a 3D video can include, for example, network conditions, available bandwidth, channel conditions, and link quality. The information associated with the transmission of the 3D video can indicate a limit to an amount of data that can be reliably transmitted. The information associated with the transmission of the 3D video can indicate improving or deteriorating conditions for the transmission of the 3D video.

In general, 3D video can be viewed through a display device, such as a virtual reality (VR) headset or augmented reality (AR) glasses. The display device can be paired with a receiving device that receives the 3D video and decompresses the 3D video. Information associated with display of a 3D video can include, for example, a field of view and a pose of a display device. The field of view can indicate a portion of a 3D video that is displayed. The field of view can be based on a pose of a display device. The pose of the display device can indicate a position and an orientation of the display device. The information associated with the display of the 3D video can indicate which objects (e.g., users) in a 3D video are displayed. The information associated with the display of the 3D video can include capabilities of the receiving device or the display device. The capabilities can include, for example, processing capabilities, memory, camera capabilities, depth sensor capabilities, display capabilities, and available codecs. The capabilities can indicate a bit rate for 3D video that the receiving device or the display device can properly process.

The feedback module 104 can support and facilitate determination of feedback control information, which can include how 3D video is captured on a device, how the 3D video is transmitted, and how the 3D video is displayed, based on information provided by the device. In some cases, the feedback control information can be based on information determined by a server. A device can provide information associated with how a 3D video is captured and information associated with how the 3D video is transmitted during transmission of the 3D video. The information associated with how the 3D video is captured and the information associated with how the 3D video is transmitted can be provided automatically, periodically, or in response to a request for information. In some cases, the information associated with how the 3D video is captured can be provided in response to a determination of a change in how the 3D video is captured, such as a change in frame size or a change in object size. The information associated with how the 3D video is transmitted can be provided in response to a determination of a change in how the 3D video is transmitted, such as a change in network conditions, a change in available bandwidth, a change in channel conditions, or a change in link quality. A device can provide information associated with how 3D video is displayed on the device in response to reception of the 3D video. The information associated with how the 3D video is displayed can be provided automatically, periodically, or in response to a request for information. In some cases, the information associated with how the 3D video is captured can be provided in response to a determination of a change in what portion of the 3D video is displayed, such as a change in which objects (e.g., users) are in a field of view.

As an example of the above, a first user can participate in a 3D video call with other users. The first user can use a first device to transmit 3D video of the first user to the other users. The first device can transmit the 3D video to a server facilitating the 3D video call. The first device can transmit the 3D video of the first user with information indicating an frame size associated with the 3D video. The first device can also transmit information indicating network conditions associated with transmission of the 3D video. The server can receive the 3D video of the first user from the first device and transmit a 3D video of the other users to the first device. The first device can display the 3D video of the other users. Based on the 3D video of the other users, the first device can provide information indicating a field of view. The information indicating the field of view can include which of the other users are displayed by the first device. The server can determine adjustments to a size of the 3D video of the first user and sizes of 3D video of the other users based on the information indicating the frame size, the information indicating network conditions, and the information indicating the field of view. Many variations are possible.

In various embodiments, the adjustment determination module 106 can support and facilitate determination of adjustments to 3D video. The adjustments to the 3D video can be based on feedback control information, which can include how 3D video is captured, how the 3D video is transmitted, and how the 3D video is displayed. During a 3D video call, a server facilitating the 3D video call can receive 3D video of each user in the 3D video call. The 3D video of each user can vary in frame size and object size. The 3D video of each user can be ordered and scaled based on corresponding frame size information and object size information to generate a 3D video for the 3D video call. The 3D video of each user can be ordered and scaled such that the 3D video for the 3D video call displays each user with similar proportions and consistent positions for the duration of the 3D video call. The adjustment determination module 106 can determine adjustments to 3D video of each user in a 3D video call based on feedback control information. Based on information associated with capture of 3D video, adjustments can be determined, for example, to set a maximum bit rate limit of the 3D video and to set a maximum frame size limit of the 3D video. In some cases, adjustments can be determined for each device in a 3D video call so that each device captures and transmits 3D video at the same bit rate, such as the lowest bit rate captured by the devices. For example, a device may capture a 3D video at a bit rate beyond what can be visible when ordered and scaled for a 3D video call. An adjustment can be determined to set a maximum bit rate limit of the 3D video captured by the device. As another example, a device may capture a 3D video with an frame size that causes the 3D video to include objects that are not included for the 3D video call, such as background objects or lower body portions of users. An adjustment can be determined to set a maximum bit rate limit or a maximum frame size limit of the 3D video captured by the device. Based on information associated with transmission of 3D video, adjustments can be determined, for example, to set a bit rate of the 3D video appropriate for network conditions. For example, a device may capture and transmit a 3D video at a bit rate beyond what can be properly transmitted. As a result, packet loss or increased latency may occur. An adjustment can be determined to set a bit rate that allows 3D video to be transmitted without problems caused by poor network conditions.

Based on information associated with how 3D video is displayed by a device in a 3D video call, adjustments can be determined, for example, to set bit rates of 3D videos captured by other devices in the 3D video call. In some cases, adjustments can be determined to set a maximum bit rate limit based on capabilities of a device. For example, a device in a 3D video call may have capabilities that limit the bit rate of 3D video that the device can properly display. Adjustments can be determined to set maximum bit rate limits of 3D video captured by other devices in the 3D video call. In some cases, adjustments can be determined to increase or decrease bit rates for 3D video captured by devices in a 3D video call based on fields of view associated with the devices. For objects (e.g., users) that are in a higher number of fields of view than other objects, adjustments can be determined to increase bit rates for devices associated with the objects that are in the higher number of fields of view and to decrease bit rates for devices associated with the other objects. For objects that are closer to a field of view than other objects, adjustments can be determined to increase bit rates for devices associated with the objects that are closer to the field of view and to decrease bit rates for devices associated with the other objects. For example, in a 3D video call, one user may be talking and the other users may be looking at the talking user. Based on field of view information associated with the other users, adjustments can be determined to increase bit rates for 3D video captured by devices of the talking user and other users who are in the field of view with the talking user. Adjustments can be determined to decrease bit rates for 3D video captured by devices of users who are outside the fields of view, away from the talking user. Further adjustments can be determined to decrease bit rates for 3D video captured by devices of users who are further from the field of view to be lower than bit rates for 3D video captured by devices of users who are closer to the field of view.

The adjustment determination module 106 can provide adjustments to 3D video to devices involved in a 3D video call. The adjustments can be provided as adjustment messages (e.g., bit rate adjustment messages, temporary maximum media bit rate requests). Many variations are possible.

In various embodiments, the adjustment application module 108 can support and facilitate application of adjustments to 3D video. In a 3D video call, a device can capture and transmit 3D video at an initial bit rate. In response to an adjustment message from a server facilitating the 3D video call, the device can adjust the 3D video based on the adjustment message. In response to an adjustment message to decrease a bit rate of a 3D video, a device can reduce a frame size associated with the 3D video. Reducing the frame size can reduce data size for point clouds or frames associated with the 3D video. The bit rate can be reduced based on the reduced data size. In some cases, a number of points in point clouds associated with the 3D video can be reduced without reducing the frame size. Decreasing the number of points in the point clouds can provide for reduced detail included in the point clouds. In response to an adjustment message to increase bit rate of a 3D video, a device can increase a frame size associated with the 3D video. Increasing the frame size allows for more data to be included in point clouds or frames associated with the 3D video. The bit rate can be increased based on the increased data size. In some cases, a number of points in point clouds associated with the 3D video can be increased without increasing the frame size. Increasing the number of points in the point clouds can provide for increased detail included in the point clouds. In some cases, as frame size is increased or reduced, a frame can be moved to track an object (e.g., a head of a user) and maintain the object in the center of the frame. For example, a device in a 3D video call can capture and transmit 3D video of a user at an initial bit rate. During the 3D video call, the device can receive an adjustment message to decrease bit rate for the 3D video. Based on the adjustment message, the device can reduce a frame size associated with the 3D video. Reducing the frame size decreases how much of the user is captured in the 3D video and decreases overall data size of the 3D video. The device can capture and transmit 3D video at the decreased bit rate until another adjustment message is received. Many variations are possible.

Figure 2A:
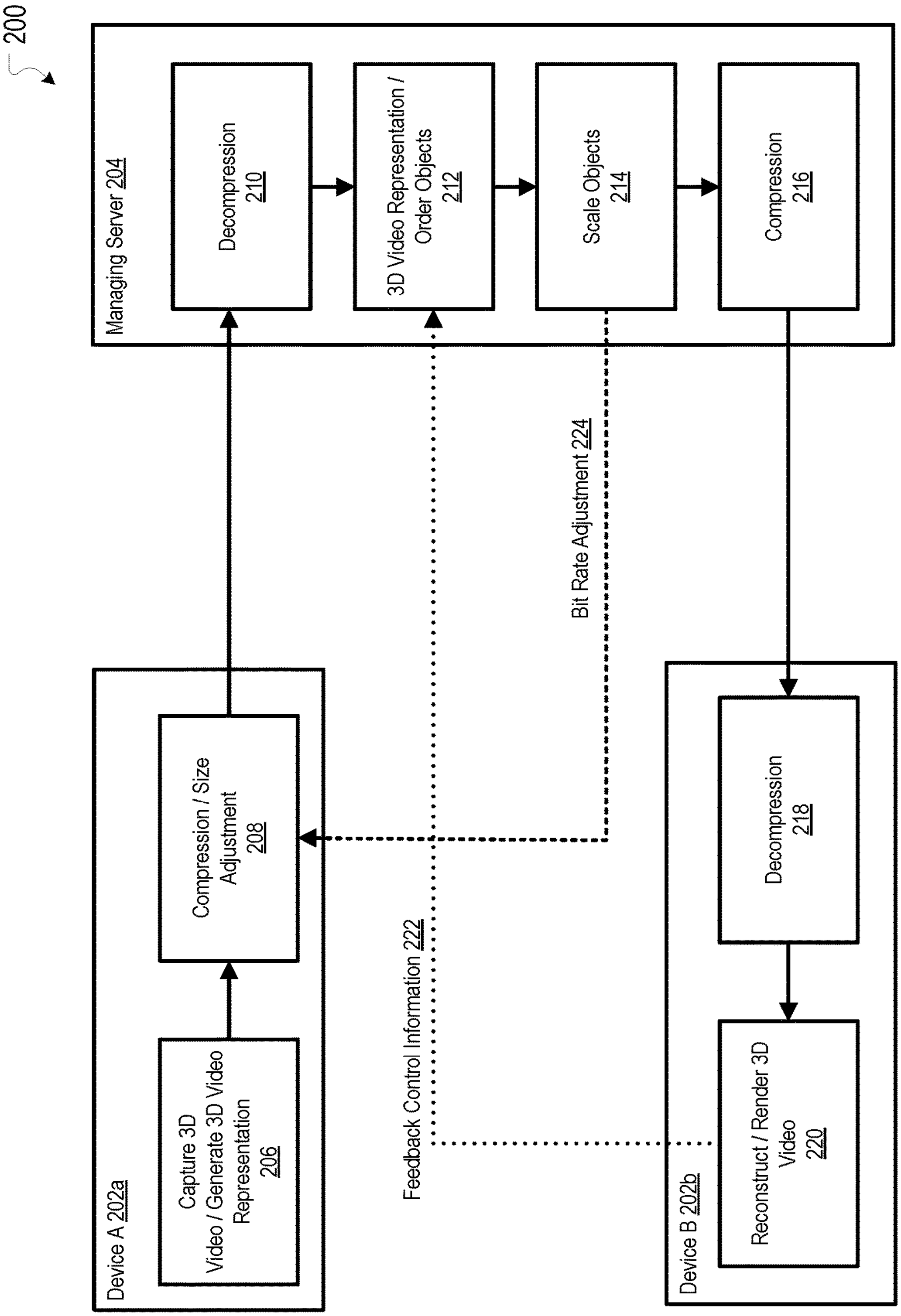
FIGS. 2A-2B illustrate example functional block diagrams, according to an embodiment of the present technology.
Figure 2B:
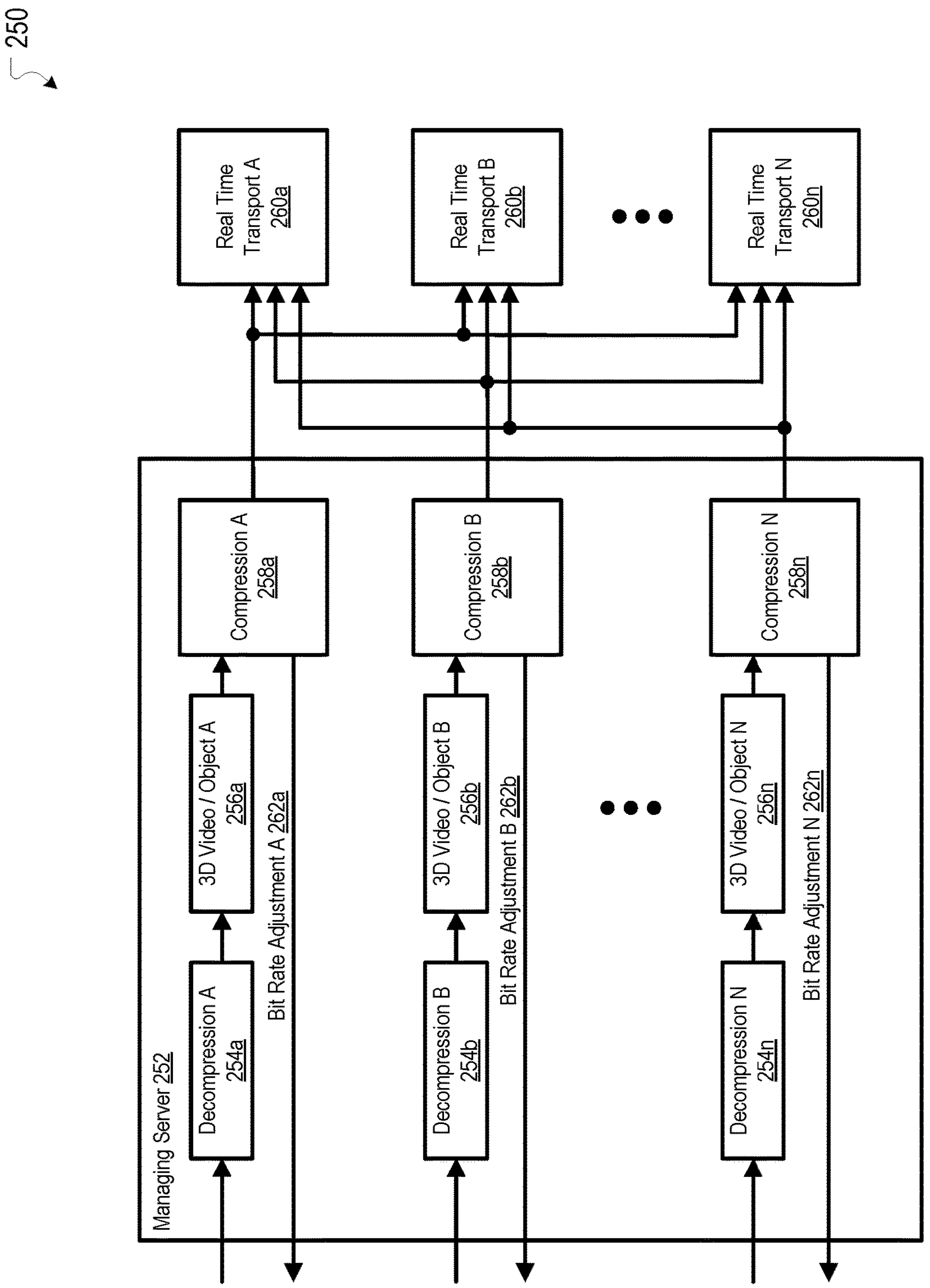

FIGS. 2A-2B illustrate example functional block diagrams, according to an embodiment of the present technology. The example functional block diagrams can be associated with one or more functions performed by the 3D video adjustment module 102 of FIG. 1. It should be understood that there can be additional, fewer, or alternative steps performed in similar or alternative orders, or in parallel, based on the various features and embodiments discussed herein unless otherwise stated. All examples herein are provided for illustrative purposes, and there can be many variations and other possibilities.

FIG. 2A illustrates an example functional block diagram 200, according to an embodiment of the present technology. The example functional block diagram 200 includes a device A 202*a*, a device B 202*b*, and a managing server 204. Device A 202*a* and device B 202*b* can be involved in a 3D video call facilitated by the managing server 204. At step 206, device A 202*a* captures 3D video and generates a 3D video representation. The 3D video representation can be an object depicted in the 3D video, such as a user of device A 202*a*. At step 208, device A 202*a* applies compression and size adjustment to the 3D video and transmits the 3D video to the managing server 204. The compression and size adjustment applied can be based on a bit rate adjustment 224 provided by the managing server 204. At step 210, decompression is applied to the 3D video. At step 212, the 3D video representation is extracted from the 3D video and the object depicted in the 3D video is ordered with other objects from other 3D videos. The managing server 204 can also receive feedback control information 222 from device B 202*b*. At step 214, the managing server 204 scales the objects from the 3D videos. The managing server 204 can provide bit rate adjustment 224 to device A 202*a* based on feedback control information 222 received from device B 202*b*. At step 216, the managing server 204 applies compression to the scaled and ordered objects to generate a 3D video for the 3D video call that is transmitted to the devices in the 3D video call. At step 218, device B 202*b* applies decompression to the received 3D video for the 3D video call. At step 220, device B 202*b* reconstructs and renders 3D video based on the received 3D video. Device B 202*b* sends feedback control information 222 based on how the received 3D video is displayed. Many variations are possible.

FIG. 2B illustrates an example functional block diagram 250, according to an embodiment of the present technology. The example functional block diagram 250 includes a managing server 252. Managing server 252 can facilitate a 3D video call between N number of devices. Managing server 252 receives 3D video from the N number of devices and each 3D video is decompressed by decompression A-N 254*a-n*. Based on the decompressed 3D video from each device, 3D video representations/objects A-N 256*a-n* are extracted. The objects A-N 256*a-n* can be ordered and scaled by managing server 252. Managing server 252 can provide bit rate adjustments A-N 262*a-n* to the devices based on the ordering and scaling of the objects A-N 256*a-n*. After objects A-N 256*a-n* are ordered and scaled, managing server 252 applies compression A-N 258*a-n* to objects A-N 256*a-n* to generate 3D video corresponding to the objects A-N 256*a-n* for the 3D video call. The 3D video for the 3D video call is provided to each device through real time transport A-N 260*a-n*. Many variations are possible.

Figure 3A:
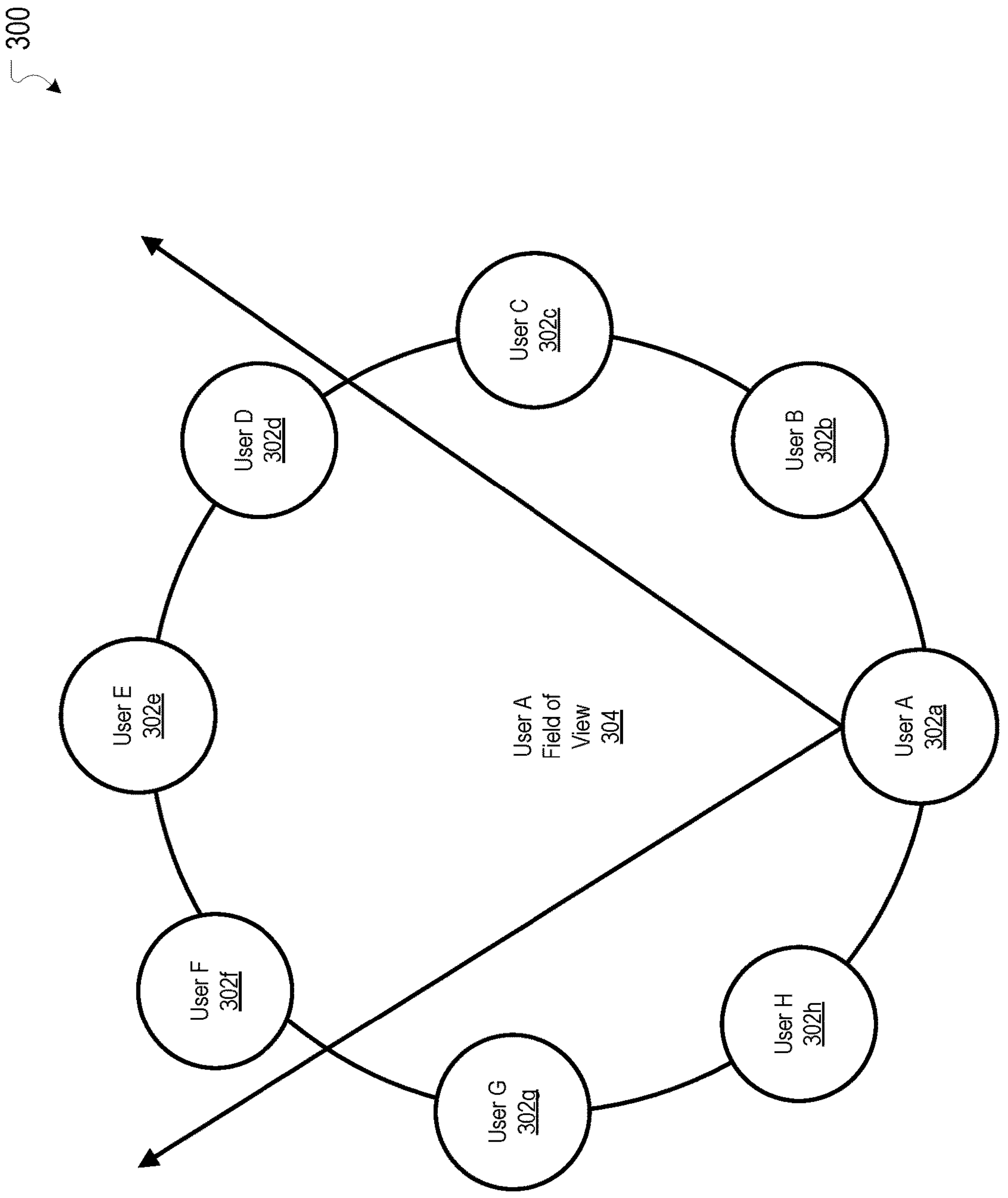
FIGS. 3A-3B illustrate examples, according to an embodiment of the present technology.
Figure 3B:
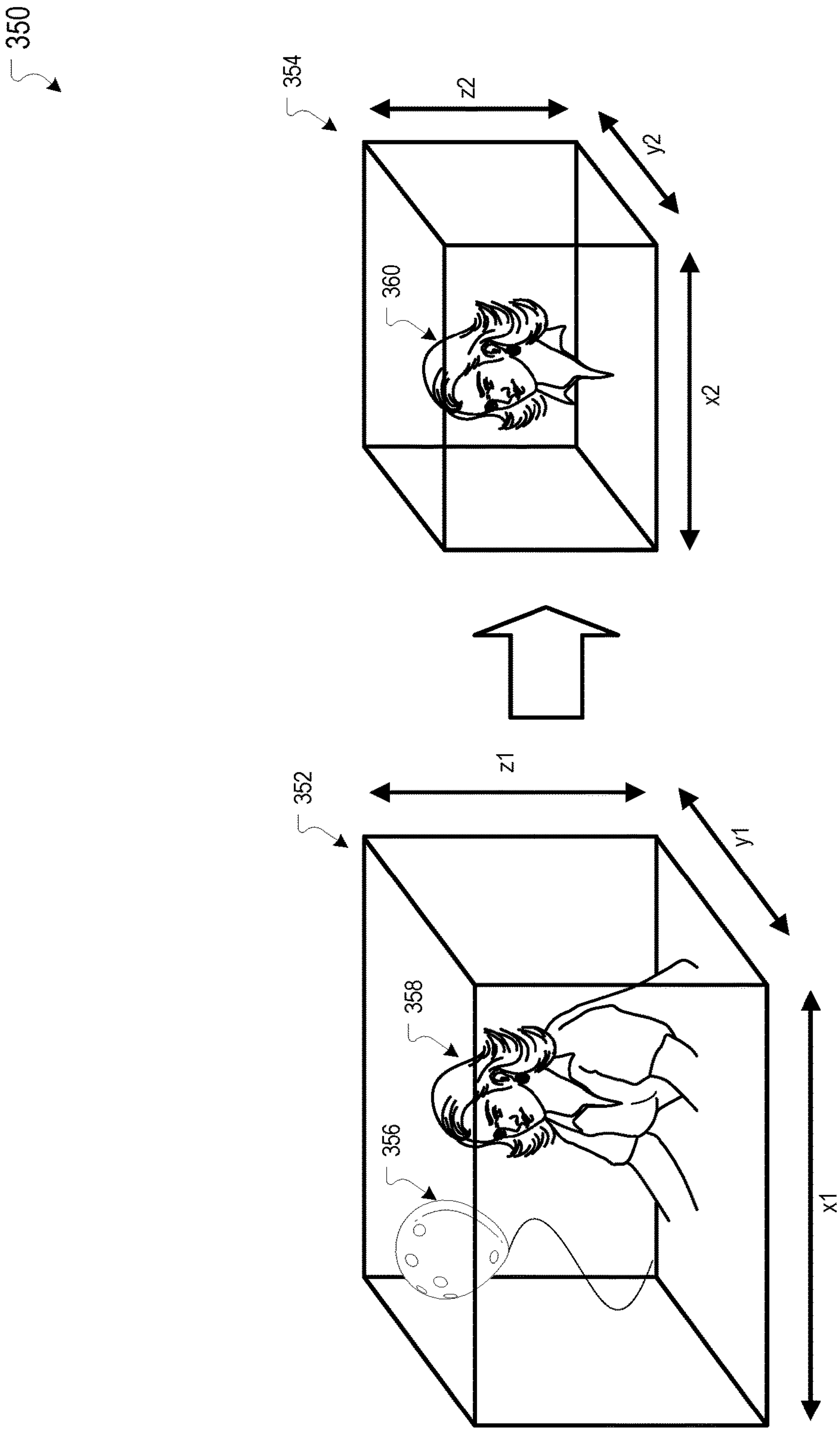

FIGS. 3A-3B illustrate examples according to an embodiment of the present technology. The examples can be associated with one or more functionalities performed by the 3D video adjustment module 102 of FIG. 1. It should be understood that there can be additional, fewer, or alternative steps performed in similar or alternative orders, or in parallel, based on the various features and embodiments discussed herein unless otherwise stated. All examples herein are provided for illustrative purposes, and there can be many variations and other possibilities.

FIG. 3A illustrates an example 300, according to an embodiment of the present technology. In the example 300, users A-H 302*a-h* are in a 3D video call. User A 302*a* is looking at user E 302*e* and has a field of view 304. Based on the field of view 304, user A 302*a* sees user F 302*f*, user E 302*e*, and user D 302*d*. Feedback control information can be provided based on the field of view 304. Based on the feedback control information, adjustments can be determined to increase and decrease bit rates for devices associated with users A-H 302*a-h*. For example, adjustments can be determined to increase bit rates for devices associated with user F 302*f*, user E 302*e*, and user D 302*d* based on user F 302*f*, user E 302*e*, and user D 302*d* being in the field of view 304. Adjustments can be determined to decrease bit rates for devices associated with user H 302*h*, user G 302*g*, user C 302*c*, and user B 302*b* based on user H 302*h*, user G 302*g*, user C 302*c*, and user B 302*b* not being in the field of view 304. Further adjustments can be determined to decrease bit rates for devices associated with user H 302*h* and user B 302*b* more than bit rates for devices associated with user G 302*g* and user C 302*c* based on user H 302*h* and user B 302*b* being farther from the field of view 304 than user G 302*g* and user C 302*c*. Many variations are possible.

FIG. 3B illustrates an example 350, according to an embodiment of the present technology. In the example 350, a device in a 3D video call has received a bit rate adjustment message to decrease bit rate. Based on the bit rate adjustment message, the device decreases a frame size for 3D video. An initial frame 352 has a frame size of x1, y1, z1. As illustrated in the example 350, the initial frame 352 includes a user 358 and a balloon 356. Following a decrease in the frame size for the 3D video, an adjusted frame 354 has a smaller frame size of x2, y2, z2. As illustrated in the example 350, the adjusted frame 354 only has space for a head 360 of the user 358. The balloon 356 is not included in the adjusted frame 354. As illustrated in this example, by decreasing the frame size, data size of the 3D video can be reduced as less content is included in the adjusted frame 354. The bit rate associated with the 3D video can be reduced based on the reduced data size. Many variations are possible.

Figure 4:
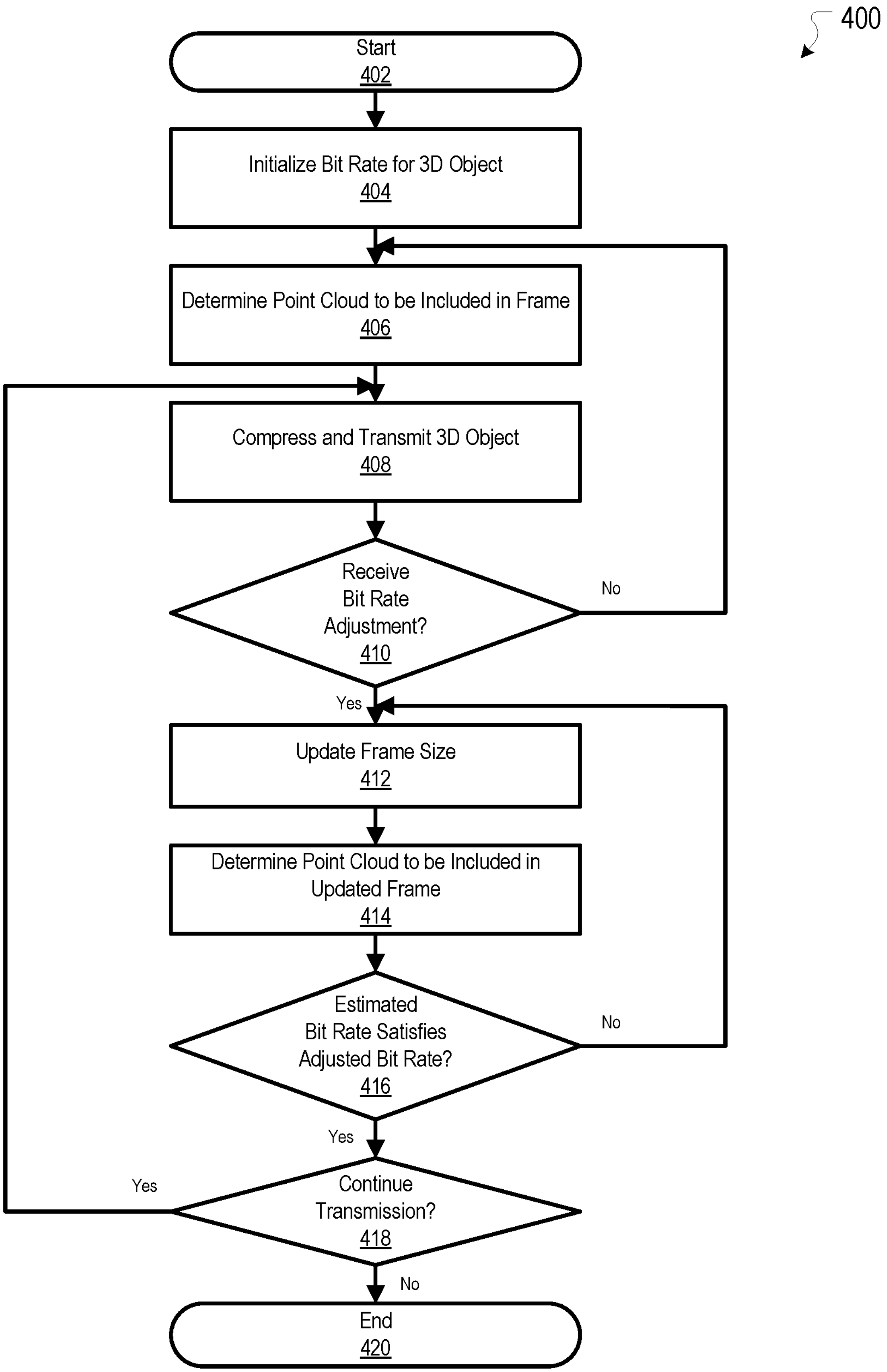
FIG. 4 illustrate an example method, according to an embodiment of the present technology.

FIG. 4 illustrates an example method 400, according to an embodiment of the present technology. The example timing diagrams can be associated with one or more functionalities performed by the 3D video adjustment module 102 of FIG. 1. It should be understood that there can be additional, fewer, or alternative steps performed in similar or alternative orders, or in parallel, based on the various features and embodiments discussed herein unless otherwise stated. All examples herein are provided for illustrative purposes, and there can be many variations and other possibilities.

As illustrated in FIG. 4, at step 402, the example method 400 starts. At step 404, the example method 400 initializes a bit rate for a 3D object. At step 406, the example method 400 determines a point cloud to be included in a frame of 3D video. At step 408, the example method 400 compresses and transmits the 3D object as the 3D video. At step 410, the example method 400 determines whether a bit rate adjustment was received. If a bit rate adjustment was not received, the example method 400 returns to step 406 to determine a point cloud to be included in a next frame of 3D video. If a bit rate adjustment was received, then at step 412, the example method 400 updates a frame size associated with the 3D video. At step 414, the example method 400 determines a point cloud to be included in an updated frame of 3D video. At step 416, the example method 400 estimates whether a bit rate associated with the updated frame of 3D video satisfies the bit rate adjustment. If the estimated bit rate does not satisfy the adjusted bit rate, the example method 400 returns to step 412 to update the frame size associated with the 3D video. If the estimated bit rate satisfies the adjusted bit rate, then at step 418, the example method 400 determines whether transmission is to continue (e.g., a 3D video call has not ended). If transmission is to continue, then the example method 400 returns to step 408 to compress and transmit the 3D object as the 3D video. If transmission is not to continue, then at step 420, the example method 400 ends. Many variations are possible.

Figure 5:
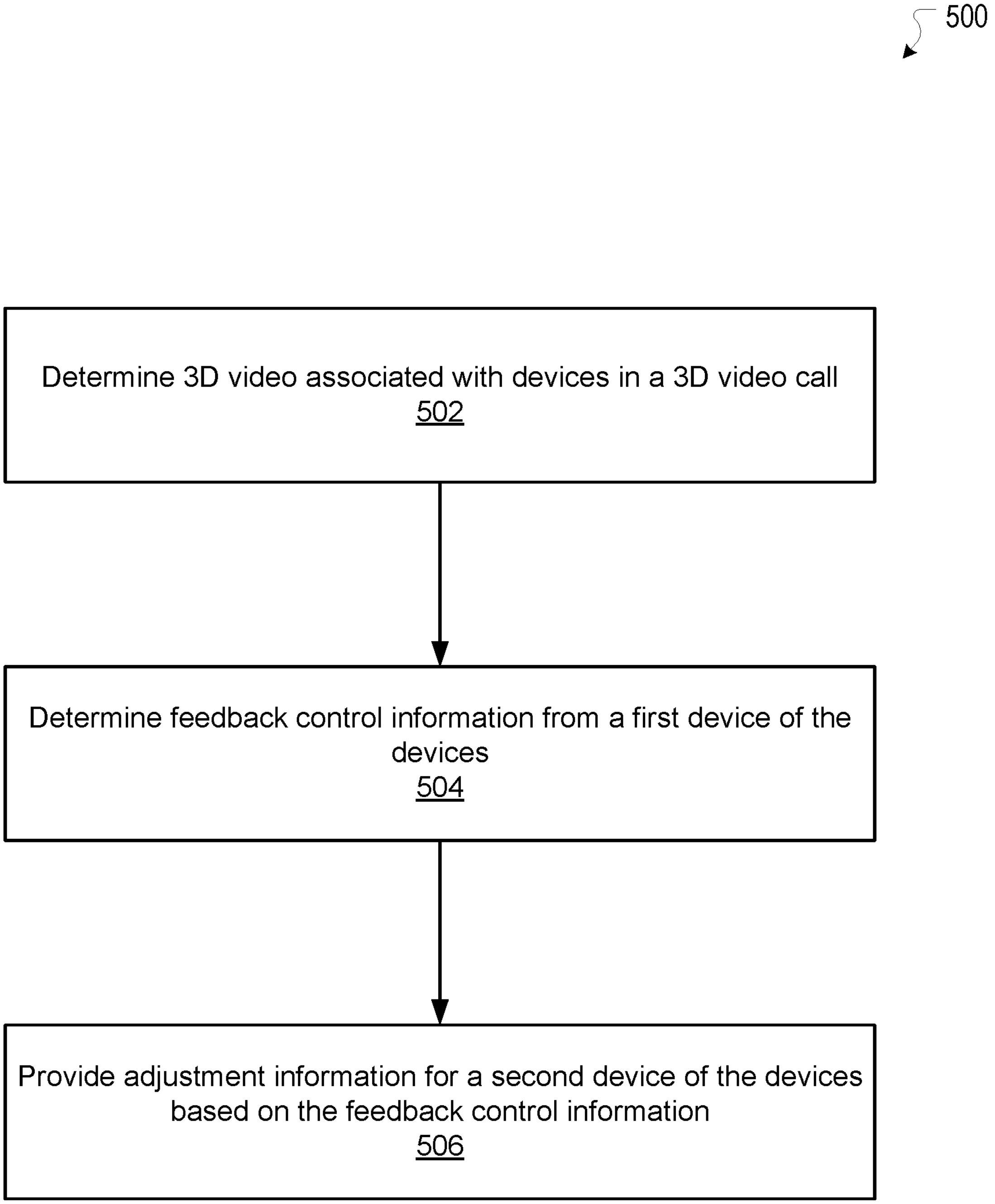
FIG. 5 illustrates an example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated. At block 502, the example method 500 determines 3D video associated with devices in a 3D video call. At block 504, the example method 500 determines feedback control information from a first device of the devices. At block 506, the example method 500 provides adjustment information for a second device of the devices based on the feedback control information.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
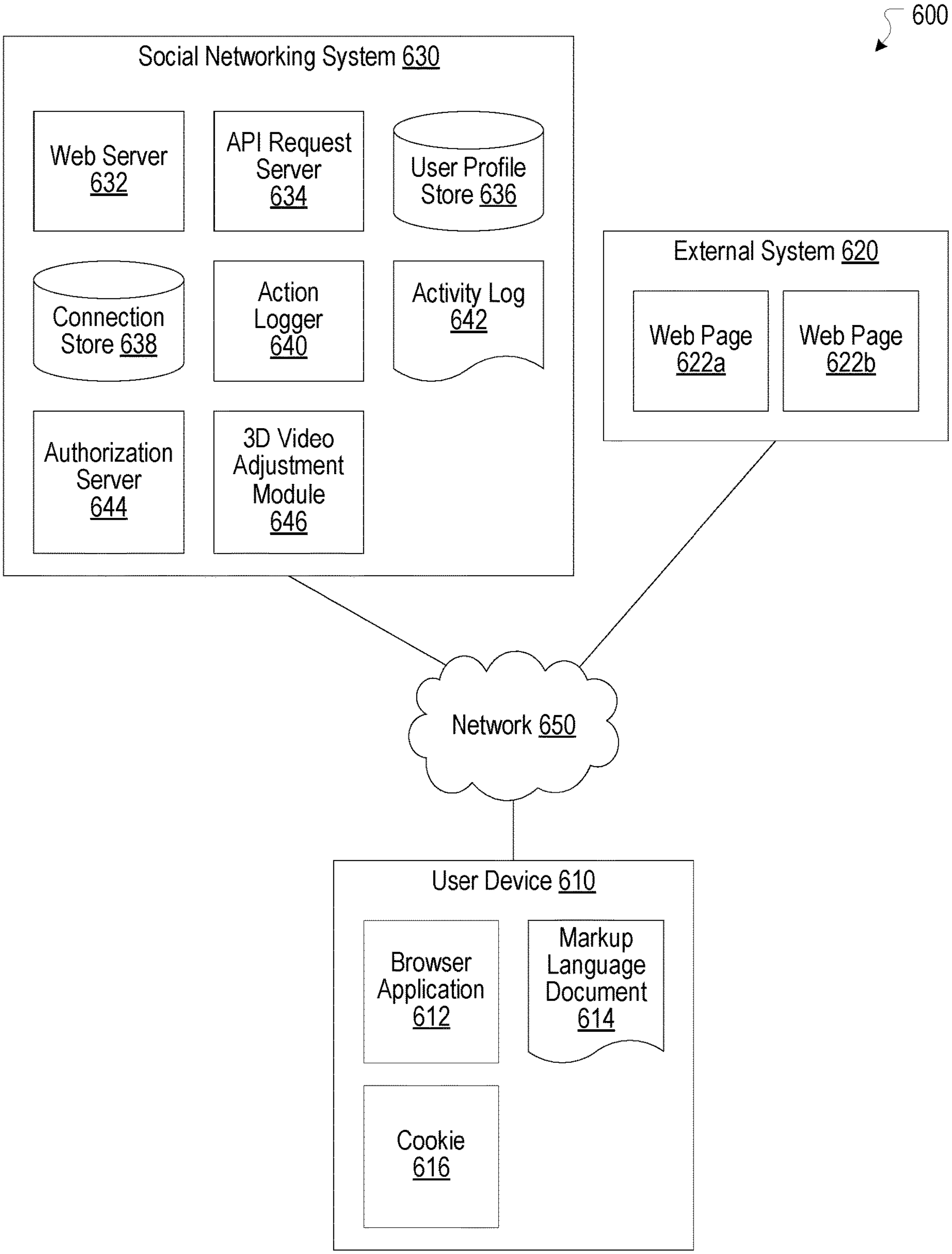
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page **622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630**.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a 3D video adjustment module 646. The 3D video adjustment module 646 can be implemented with the 3D video adjustment module 102, as discussed in more detail herein. In various embodiments, some or all functionality of the 3D video adjustment module 102 can be additionally or alternatively implemented by the user device 610. It should be appreciated that there can be many variations or other possibilities.

Hardware Implementation

Figure 7:
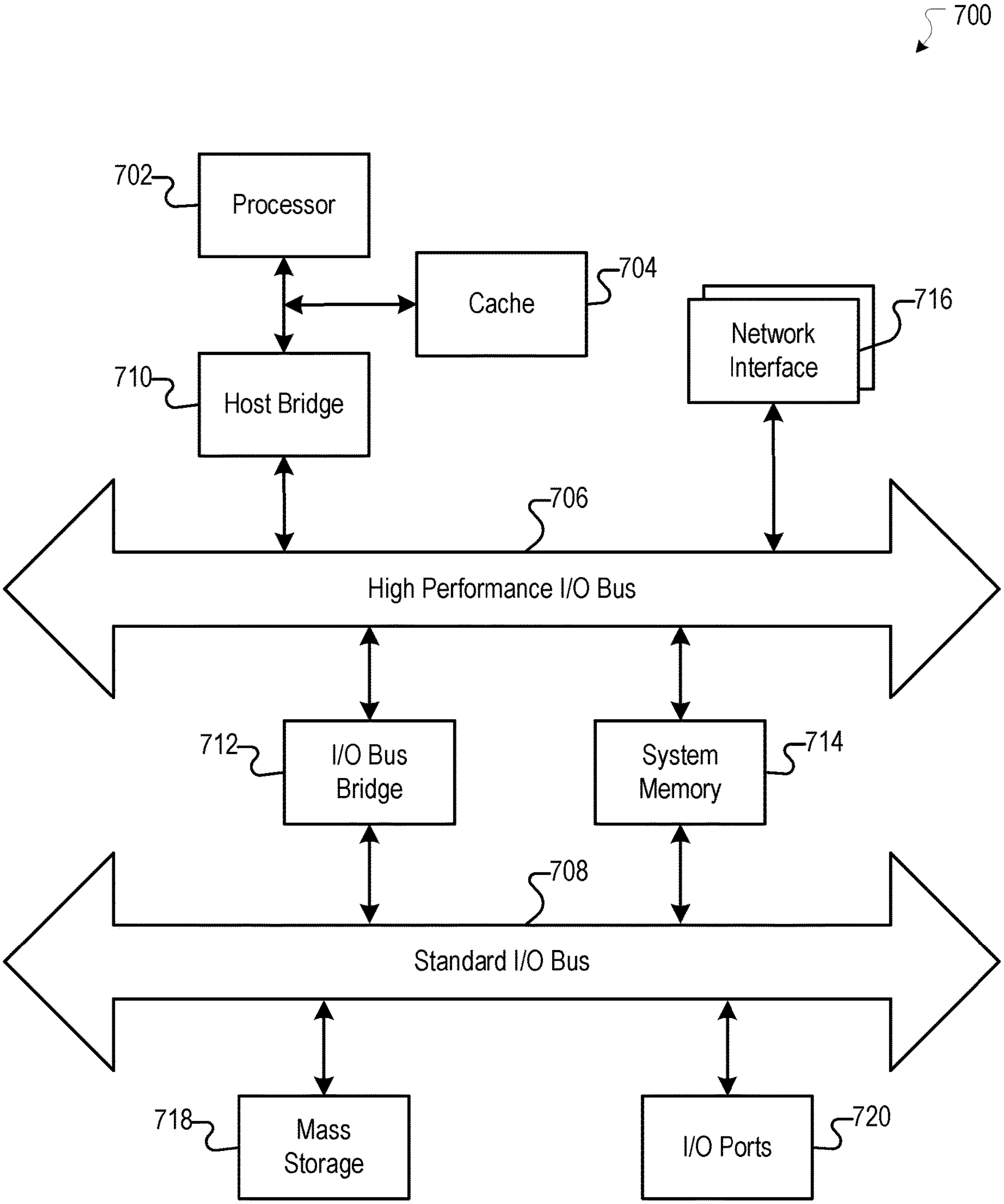
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

determining, by a computing system, three dimensional (3D) video associated with devices in a 3D video call;

determining, by the computing system, feedback control information from a first device of the devices;

providing, by the computing system, adjustment information for a second device of the devices based on the feedback control information, wherein the feedback control information comprises field of view information from the first device indicating which users in the 3D video call are displayed by the first device, and wherein the adjustment information causes the second device to increase or decrease at least one of a bit rate, a frame size, or a number of points in a point cloud based on a number of devices in the 3D video call for which 3D video of the second device is displayed; and determining, by the computing system, at least one of: network conditions, available bandwidth, link quality, or channel condition associated with the second device, wherein the adjustment information is based on the at least one of: network conditions, available bandwidth, link quality, or channel conditions.

2. The computer-implemented method of claim 1, wherein the feedback control information is based on display of a first 3D video by the first device.

3. The computer-implemented method of claim 1, wherein at least one of: a bit rate, a frame size, or a number of points in a point cloud associated with a second 3D video of the second device is increased or decreased based on the adjustment information.

4. The computer-implemented method of claim 1, wherein the feedback control information includes field of view information associated with the first device, and wherein the adjustment information is based on the field of view information.

5. The computer-implemented method of claim 1, wherein the feedback control information includes device capabilities associated with the first device, and wherein the adjustment information is based on the device capabilities.

6. The computer-implemented method of claim 1, wherein the feedback control information includes a bit rate of first 3D video captured by the first device, and wherein the adjustment information is based on the bit rate of the first 3D video.

7. The computer-implemented method of claim 1, wherein the feedback control information includes a pose associated with the first device, and wherein the adjustment information is based on a field of view determined based on the pose.

8. The computer-implemented method of claim 1, wherein the feedback control information is determined based on a change in objects in a field of view associated with the first device.

9. The computer-implemented method of claim 1, further comprising:

ordering, by the computing system, objects in the 3D video associated with the devices in the 3D video call; and scaling, by the computing system, the object in the 3D video associated with the devices in the 3D video call.

10. A system comprising:

at least one processor; and a memory storing instructions that, when executed by the at least one processor, cause the system to perform operations comprising:

determining three dimensional (3D) video associated with devices in a 3D video call;

determining feedback control information from a first device of the devices;

providing adjustment information for a second device of the devices based on the feedback control information, wherein the feedback control information comprises field of view information from the first device indicating which users in the 3D video call are displayed by the first device, and wherein the adjustment information causes the second device to increase or decrease at least one of a bit rate, a frame size, or a number of points in a point cloud based on a number of devices in the 3D video call for which 3D video of the second device is displayed; and determining, by the computing system, at least one of: network conditions, available bandwidth, link quality, or channel condition associated with the second device, wherein the adjustment information is based on the at least one of: network conditions, available bandwidth, link quality, or channel conditions.

11. The system of claim 10, wherein the feedback control information is based on display of a first 3D video by the first device.

12. The system of claim 10, wherein the feedback control information includes field of view information associated with the first device, and wherein the adjustment information is based on the field of view information.

13. The system of claim 10, wherein the feedback control information includes field of view information associated with the first device, and wherein the adjustment information is based on the field of view information.

14. The system of claim 10, wherein the feedback control information includes device capabilities associated with the first device, and wherein the adjustment information is based on the device capabilities.

15. A non-transitory computer-readable storage medium including instructions that, when executed by at least one processor of a computing system, cause the computing system to perform operations comprising:

determining three dimensional (3D) video associated with devices in a 3D video call;

determining feedback control information from a first device of the devices;

providing adjustment information for a second device of the devices based on the feedback control information, wherein the feedback control information comprises field of view information from the first device indicating which users in the 3D video call are displayed by the first device, and wherein the adjustment information causes the second device to increase or decrease at least one of a bit rate, a frame size, or a number of points in a point cloud based on a number of devices in the 3D video call for which 3D video of the second device is displayed; and determining, by the computing system, at least one of: network conditions, available bandwidth, link quality, or channel condition associated with the second device, wherein the adjustment information is based on the at least one of: network conditions, available bandwidth, link quality, or channel conditions.

16. The non-transitory computer-readable storage medium of claim 15, wherein the feedback control information is based on display of a first 3D video by the first device.

17. The non-transitory computer-readable storage medium of claim 15, wherein at least one of: a bit rate, a frame size, or a number of points in a point cloud associated with a second 3D video of the second device is increased or decreased based on the adjustment.

18. The non-transitory computer-readable storage medium of claim 15, wherein the feedback control information includes field of view information associated with the first device, and wherein the adjustment information is based on the field of view information.

19. The non-transitory computer-readable storage medium of claim 15, wherein the feedback control information includes device capabilities associated with the first device, and wherein the adjustment information is based on the device capabilities.

* * * * *